United States Patent
Fontaine et al.

(10) Patent No.: US 7,883,120 B2
(45) Date of Patent: Feb. 8, 2011

(54) MALE ELEMENT FOR A SEALED THREADED TUBULAR CONNECTION

(75) Inventors: Ludovic Fontaine, Aulnoye-Aymeries (FR); Benoit Duquesne, Valenciennes (FR); Gregory Molins, Valenciennes (FR)

(73) Assignee: Vallourec Mannesmann Oil & Gas France, Aulnoye-Aymeries (FR)

( * ) Notice: Subject to any disclaimer, the term of this patent is extended or adjusted under 35 U.S.C. 154(b) by 418 days.

(21) Appl. No.: 11/574,591

(22) PCT Filed: Sep. 8, 2005

(86) PCT No.: PCT/EP2005/009844
§ 371 (c)(1),
(2), (4) Date: Mar. 2, 2007

(87) PCT Pub. No.: WO2006/027276
PCT Pub. Date: Mar. 16, 2006

(65) Prior Publication Data
US 2007/0246935 A1    Oct. 25, 2007

(30) Foreign Application Priority Data
Sep. 9, 2004    (FR) .................................. 04 09567

(51) Int. Cl.
*F16L 25/00*    (2006.01)
(52) U.S. Cl. ................... 285/333; 285/334; 285/355; 285/390
(58) Field of Classification Search ......... 285/333–334, 285/355, 390
See application file for complete search history.

(56) References Cited

U.S. PATENT DOCUMENTS

| | | | |
|---|---|---|---|
| 3,100,657 A | | 8/1963 | Pistole et al. |
| 4,671,544 A | * | 6/1987 | Ortloff ........................ 285/334 |
| 4,707,001 A | * | 11/1987 | Johnson .................... 285/332.3 |
| 4,786,090 A | * | 11/1988 | Mott ........................ 285/332.3 |
| 5,066,052 A | * | 11/1991 | Read ........................... 285/334 |
| 5,092,635 A | * | 3/1992 | DeLange et al. ............. 285/334 |
| 5,286,069 A | * | 2/1994 | Wilson ........................ 285/114 |
| 6,347,814 B1 | * | 2/2002 | Cerruti ........................ 285/334 |
| 6,712,401 B2 | | 3/2004 | Coulon et al. |
| 6,752,436 B1 | * | 6/2004 | Verdillon .................... 285/333 |
| 2003/0067166 A1 | | 4/2003 | Sivley, IV |
| 2005/0087983 A1 | * | 4/2005 | Verger et al. ................ 285/333 |

FOREIGN PATENT DOCUMENTS

| | | |
|---|---|---|
| EP | 0 032 265 | 7/1981 |
| FR | 2 863 029 | 6/2005 |

(Continued)

*Primary Examiner*—Aaron Dunwoody
*Assistant Examiner*—Fannie Kee
(74) *Attorney, Agent, or Firm*—Oblon, Spivak, McClelland, Maier & Neustadt, L.L.P.

(57) ABSTRACT

A male element for a sealed threaded tubular connection. Before tapered reduction swaging of an end region of a tube and machining in the region of a tapered male threading and a male lip to obtain a male tubular element for makeup into a female tubular element to form a sealed threaded tubular connection after diametrical expansion, the tube is shaped over a portion of its length to produce a cylindrical internal surface that connects via a chamfer to the cylindrical internal surface of the lip obtained subsequently by machining, the radius of the first surface being greater than the radius of the second surface.

23 Claims, 1 Drawing Sheet

FOREIGN PATENT DOCUMENTS

| | | |
|---|---|---|
| FR | 2 863 030 | 6/2005 |
| FR | 2 863 031 | 6/2005 |
| WO | WO 02/01102 | 1/2002 |
| WO | WO 03/060370 | 7/2003 |
| WO | 2004 003416 | 1/2004 |
| WO | WO 2004/079246 | 9/2004 |

* cited by examiner

MALE ELEMENT FOR A SEALED THREADED TUBULAR CONNECTION

DISCUSSION OF THE BACKGROUND

Male tubular elements of threaded connections are generally obtained by machining tubes which are tightened in jaws acting on the outer surface of the tubes.

For a variety of reasons, it may be necessary to machine the inner surface of the male tubular element close to the front surface of the free end.

As an example, for the efficiency of a metal-metal sealing surface close to a free end it is desirable to provide a defined constant thickness beneath the surface around the circumference.

Alternatively, when the front surface of the free end is to act as an axial abutment, the transverse cross section of that front surface must be well defined in order to determine the maximum makeup torque which that section can take.

Other circumstances can also arise.

The inner surface of the tubes carries imperfections, both macrogeometric (variations in diameter, eccentricity with respect to the outer surface) and microgeometric (surface quality).

API specification 5CT from the American Petroleum Institute (API) for casing and tubing prescribes the following tolerances:

for the external diameter, −0.50% to +1%;
for the thickness, ±12.5%;
for the mass, −3.5% to +6.5%.

In respect of the internal diameter, the API indicates that the tolerances are governed by those for the external diameter and the mass. Thus, they are much wider than those for the external diameter.

Regarding the eccentricity of the internal surface with respect to the external surface, this is included in the tolerance for the thickness.

Conventionally, the internal surface is machined over an axial length of the order of 20 mm and this machined surface is connected to the internal surface of the remainder of the tube via a tapered chamfer with a small inclination: see, for example, the VAM ® catalogue published by the Applicant, under the NEW VAM® heading.

When the thickness of the tube is insufficient to allow effective machining of the internal surface, prior to machining, a reduction swaging of the end is performed (also known as tapering).

Such known measures may prove to be insufficient in some cases, for example when the sealing surface is not adjacent to the free end or in the immediate vicinity thereof or, and in particular, when the male element is a tubular element constituting a threaded connection intended to undergo diametrical expansion and to be sealed after expansion.

More particularly, we are concerned with threaded tubular connections intended to undergo diametrical expansion in the plastic deformation region using an expansion tool with a diameter that is greater than the internal diameter of the connection, which is axially displaced therein, as described, for example, in WO-A-02/01102.

SUMMARY OF THE INVENTION

It has been shown that the transition between the non-machined zone and the machined zone, with a larger diameter, of the internal surface of the tube is detrimental to the action of the expansion mandrel and has a negative effect on the quality of contact, in particular the contact pressure, between the sealing surfaces of the male and female elements after expansion.

The same disadvantages are caused by irregularities in the internal surface of the male element in its non-machined portion, whether it is due to eccentricity with respect to the external surface, circularity problems or irregularities in the axial direction, or surface imperfections (seams, scratches, roughness, etc).

The invention aims to overcome the above disadvantages.

The invention concerns a male tubular element formed in an end region of a tube, the external surface and internal surface of which have substantially circular transverse cross sections with a substantially constant diameter but element comprising a first tapered male threading and at least one first sealing surface, which cooperates by makeup with a female tubular element comprising a second female tapered threading and at least one second sealing surface to form a sealed threaded tubular connection in which said sealing surfaces are in mutual sealing contact metal to metal, the internal surface of said male tubular element having a first zone adjacent to the free end of the male element, with a circular cross section and concentric with the external surface of the tube.

The invention provides in particular that the internal surface of said male tubular element comprises a second zone which follows the first zone axially, with a circular cross section which is concentric with the external surface of the tube, having a larger radius than that of said first zone, and which is larger than that of the internal surface of the remainder of the length of the tube.

The term "sealing contact" as used here means contact between two surfaces which are strongly pressed against each other to produce a metal-on-metal seal, particularly against gas.

Optional characteristics of the invention, which may be complementary or substitutional, are defined below:

- The radius of the second zone is less than or equal to half the maximum internal diameter of the tube, resulting from the tolerances defined above.
- The radius of the second zone is close to half the maximum internal diameter of the tube.
- The second zone extends axially on the side opposite to the free end, at least to the end of the threading opposite to the free end.
- The second zone extends axially to the end of the male tubular element which is not free.
- The male threading is separated from the free end by a lip and the first zone extends axially up to the lip or the first threads.
- The second zone is connected to the first zone via an essentially tapered surface.
- Said essentially tapered surface connecting to the first zone has an apex half angle of 15° or less.
- The second zone is connected to the internal surface of the remainder of the tube via an essentially tapered surface.
- Said essentially tapered surface connecting to the internal surface of the remainder of the tube has an apex half angle of 15° or less.
- The radius of the first zone is less than half the nominal value for the diameter of the internal surface of the tube.
- At least one sealing surface is disposed on a lip disposed between the male threading and the free end.
- At least one sealing surface is disposed beyond the male threading on the side opposite to the free end.
- The front surface of the free end is an axial abutment surface for said female tubular element.

The surface quality of the second zone is better than that of the internal surface over the remainder of the length of the tube.

The invention also concerns a threaded tubular connection comprising a male tubular element as defined above and a female tubular element cooperating with the male tubular element, and a method for producing said tubular element in which the first zone is obtained by a first shaping and the second zone is obtained by a second shaping.

The method of the invention may comprise some or all of the following features:

The second shaping is carried out after the first shaping.

The second zone is obtained by removing material.

The second zone is obtained by machining,

Over a fraction of the length of said end region, prior to producing said first zone, the tube undergoes a reduction swaging operation to progressively decrease the external and internal diameters up to the free end.

Said essentially tapered surface connecting the second zone to the first zone is formed by the reduction swaging operation.

The reduction swaging operation is carried out prior to the first and second shapings.

The invention also provides a method for producing a sealed tubular connection in which an initial tubular connection as defined above undergoes diametrical expansion in the plastic deformation region using an expansion tool with a radius which is greater than the internal radius of said second zone of the male element, which is axially displaced in the connection.

Advantageously, in the latter method:

The second zone extends to an axial distance from the free end of the male element that is at least equal to the total length of the connection.

The second zone extends to an axial distance from the free end of the male element such that the expansion tool expands the second zone when it axially passes under said sealing surface disposed beyond the male threading.

BRIEF DESCRIPTION OF THE DRAWINGS

The characteristics and advantages of the invention are described in more detail in the following description, made with reference to the accompanying drawings in which identical or analogous elements are designated by the same reference numerals in all of the figures.

DETAILED DESCRIPTION OF THE PREFERRED EMBODIMENTS

Figure 1:
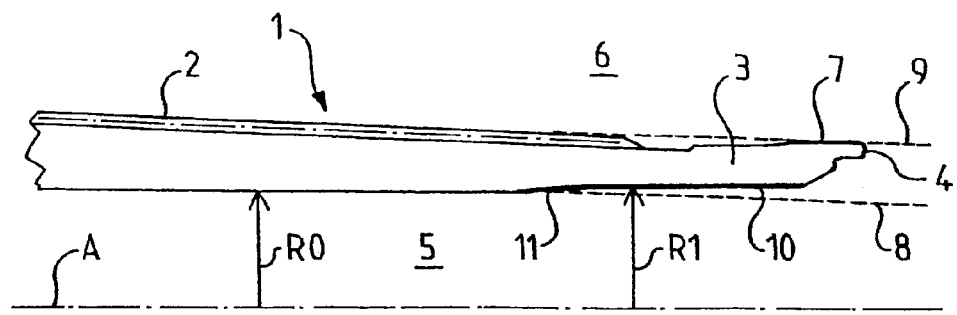
FIG. 1 is a partial half cross-section of a male tubular element of the prior art.
Figure 2:
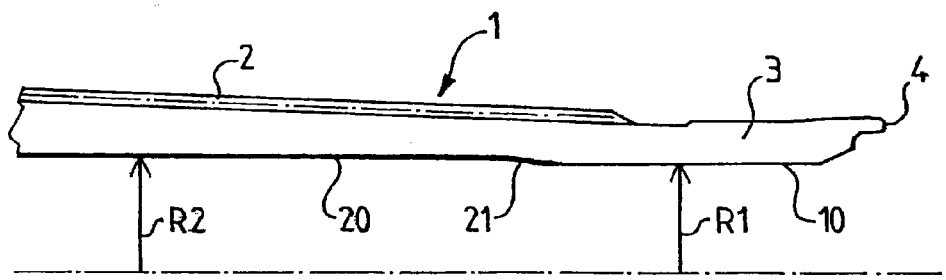
FIG. 2 is an analogous view to FIG. 1 relating to a male tubular element of the invention.

The known male tubular element 1 shown in FIG. 1, which approximates to a figure of revolution about an axis A which is that of the external surface of the tube, comprises a male tapered threading 2 and a male lip 3 extending between the threading 2 and the free end 4 of the element. The threading 2 and the lip 3 are intended to cooperate in known manner with a tapered female threading and a female recess in a female tubular element (not shown) to produce a connection by making up the two elements and producing a seal between the internal space 5 of the resulting threaded tubular connection and the external medium 6, at least one sealing surface 7 being provided on the lip 3 to come into sealing contact with a corresponding surface of the female recess, either directly after makeup if the sealing surfaces interfere radially, for example taper on taper, or after diametrical expansion as described in U.S. Pat. No. 6,712,401 if the tubular connection is intended to be expanded before being brought into service.

The threading 2 and the lip 3 are produced by machining after a reduction swaging operation applied to the end region of the tube intended to form the element 1 to give the internal surface 8 and the external surface 9 of the tube a tapered shape in this region.

In this known tubular element, the radially internal surface 10 of the lip 3 is obtained by a first shaping, for example machining, after the reduction swaging operation. This surface 10 is coaxial with the external surface of the tube and has a radius R1 which is greater than the internal radius R0 of the remainder of the tube, the portions with radii R0 and R1 being connected via a chamfer 11 facing the free end of the tube.

It has been shown that this configuration affects the behaviour of the connection during passage of the expansion tool along the chamfer 11 and as a result, damages the seal of the connection after expansion. The same effects are caused by variations in the radius R0 both in the longitudinal direction and in the circumferential direction, and by the eccentricity of the raw internal surface of the element with respect to the machined external surface, the axis with reference numeral A being that of the external surface of the tube, which is held in the jaws of the lathe used to machine the element 1.

These disadvantages are eliminated by the second shaping step of the method of the invention, thanks to which, after machining threading 2 and lip 3 and the first shaping of the surface 10, element 1 has, over at least a fraction of its length adjacent to the lip 3, a cylindrical internal surface 20 with a radius R2 which is greater than the radius R1 of the internal surface 10 of the lip 3, the surfaces 10 and 20 then being connected via a chamfer 21 which faces in a direction opposite to the free end 4 of the element. Further, the surface 20, preferably formed by lathe machining, has a precisely constant radius R2 both in the longitudinal direction and in the circumferential direction, and is concentric with the machined external surface of the element 1.

Other methods for producing the surface 20 may be carried out: chemical machining, electrolytic machining by electro-erosion or any other means, material removal (laser, ion beam etching etc) or without removing material, by hot or cold deformation, or by using a shaping piece.

Figure 3:
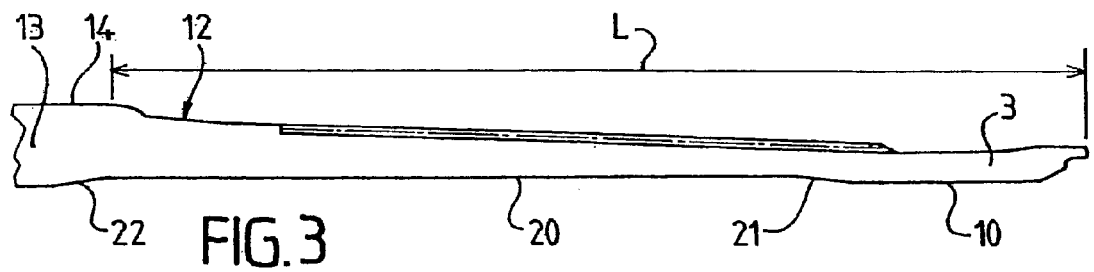
FIG. 3 is a partial half cross-section of a male tubular element of the invention.

As can be seen in FIG. 3, the shaped surface 20 preferably extends over the entire length L of the threaded element with the exception of the lip 3, i.e. axially up to the junction between the machined portion 12 of the external surface of the tube 13 and the remaining raw portion 14 of this external surface.

Figure 4:
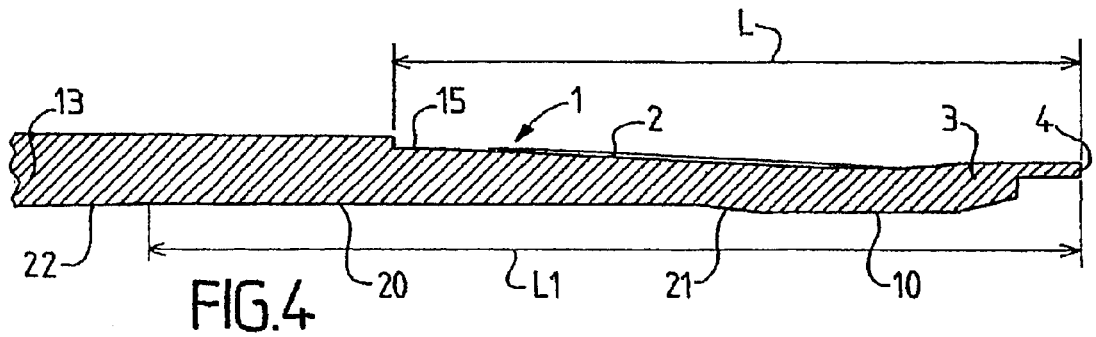
FIG. 4 is a partial half cross-section showing a male tubular element of the invention and the adjacent zone of the tube of which it forms a part.

In the case in which the male element 1 has, in addition to or instead of the sealing surface 7, a sealing surface 15 located beyond the threading 2 with respect to its free end 4, it is advantageous, as shown in FIG. 4, for the shaped surface 20 to extend to a distance L1 from the free end 4 which is slightly greater than the length L of the element 1, so that the expansion tool expands the surface 20 when it axially passes the sealing surface 15.

Figure 5:
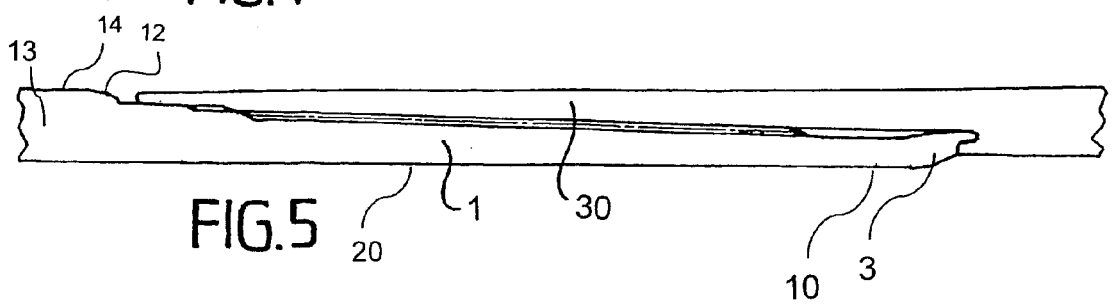
FIG. 5 is a partial half cross-section of an initial tubular connection formed by a male tubular element of the invention and a female tubular element.

FIG. 5 shows a threaded tubular connection obtained by making up the male element 1 of FIG. 3 into a suitable female element 30 that is known per se.

EXAMPLE

A male tubular element is produced in accordance with FIG. 3 from a tube with a nominal diameter of 193.68 mm (external diameter) and a linear mass of 44.2 kg/m, producing a nominal internal diameter of 174.63 mm (minimum diameter and maximum diameter according to API of 172.24 mm and 177.47 mm respectively). This element has a sealing surface 7 on the lip 3 (internal sealing surface) and a sealing surface 15 opposite to the free end 4 with respect to the threading 2 (external sealing surface). It also has the following numerical characteristics:

| | |
|---|---|
| Radius R1 | 87.315 mm |
| Radius R2 | 88.025 mm |
| | (API maximum semi-diameter = 88.735 mm) |
| inclination of chamfer 21 | 5° |
| inclination of chamfer 22 | 6° |
| length L1 | 101 mm |

The male element obtained is made up into a suitable female element and an expansion tool with a diameter of 194 mm is passed into the resulting connection. The internal sealing surface then has two annular zones of effective contact with the corresponding surface of the female element, and the external sealing surface has an effective annular contact zone with the corresponding surface of the female element. Computer simulation (finished elements) is used to determine the axial length of the effective contact zone and the distribution of contact pressure for each of these three contact zones, which allows the integral of the contact pressure to be calculated over the length of the zone, which is the most significant measure of contact quality.

Comparative Example

The procedure of the Example is followed, omitting the shaping step. After expansion, contact zones analogous to those of the example are obtained for which the same calculations are carried out, based on a radius R0 equal to half the minimal internal diameter.

The results are given in the table below, as a percentage of the integral of the contact pressure with respect to the internal sealing zone 1, or to the external sealing surface, in the comparative example.

Reference should be made to WO-A-03/60370 for a description of the two internal sealing zones.

TABLE

| | Example | | | Comparative example | | |
|---|---|---|---|---|---|---|
| | Internal seal | | External | Internal seal | | External |
| | zone 1 | zone 2 | seal | zone 1 | zone 2 | seal |
| Integral P (%) | 267 | 99 | 102 | 100 | 24 | 100 |

It can be seen that the invention provides a considerable improvement in contact pressures after expansion, in particular as regards the two contact zones of the internal seal.

The invention is applicable to threaded tubular connections of various configurations, in particular those described in U.S. Pat. No. 6,712,401, WO-A-03/60370 and WO-A-04/003416, in International patent application PCT/EP2004/002196 filed on 4 Mar. 2004 and in French patent applications 0314037, 0314038 and 0314039 filed on 28 Nov. 2003.

The invention claimed is:

1. A male tubular element formed in an end region of a tube, the tube including a main body that has an external surface and internal surface of which have substantially circular transverse cross sections with a substantially constant diameter but that may not be perfectly concentric, the male tubular element comprising:
a tapered male threading and at least one sealing surface, which cooperates by makeup with a female tubular element including a female tapered threading and at least one sealing surface to form a sealed threaded tubular connection in which the sealing surfaces are in mutual metal to metal sealing contact, the at least one sealing surface of the male tubular element being disposed on a lip disposed between the male threading and a free end, or beyond the male threading on a side opposite to the free end, the internal surface of the male tubular element including a cylindrical first zone adjacent to the free end of the male element, the cylindrical first zone of the internal surface of the male tubular element including a radius and being concentric with the external surface of the tube,
wherein the internal surface of the male tubular element includes a cylindrical second zone that axially follows the cylindrical first zone, the cylindrical second zone of the internal surface of the male tubular element including a radius and being concentric with the external surface of the tube, the radius of the cylindrical second zone of the internal surface of the male tubular element being greater than the radius of the cylindrical first zone of the internal surface of the male tubular element, and the radius of the cylindrical second zone of the internal surface of the male tubular element being greater than a radius of the internal surface of the main body of the tube, the main body of the tube being a portion of the tube that is beyond the cylindrical second zone and the male threading on the side opposite to the free end.

2. A male tubular element according to claim 1,
wherein an external diameter, a thickness and a mass of the tube are manufactured with the following tolerances:
the external diameter, −0.50% to +1%,
the thickness, ±12.5%,
the mass, −3.5% to +6.5%,
wherein an internal diameter of the tube at any given point along a length of the tube is governed by the tolerances for the external diameter and the mass, and
wherein the radius of the cylindrical second zone is less than or equal to half a maximum internal diameter of the tube as governed by the tolerances for the external diameter and the mass.

3. A male tubular element according to claim 2, wherein the radius of the cylindrical second zone is close to half the maximum internal diameter of the tube as governed by the tolerances for the external diameter and the mass.

4. A male tubular element according to claim 2, wherein the radius of the cylindrical first zone is less than half the nominal value for the diameter of the internal surface of the tube as governed by the tolerances for the external diameter and the mass.

5. A male tubular element according to claim 1, wherein the cylindrical second zone extends axially on the side opposite to the free end, at least to the end of the threading opposite to the free end.

6. A male tubular element according to claim 1, wherein the cylindrical second zone extends axially to the end of the male tubular element which is not free.

7. A male tubular element according to claim 1, wherein the male threading is separated from the free end by a lip and the cylindrical first zone extends axially up to the lip or first threads of the male threading.

8. A male tubular element according to claim 1, wherein the cylindrical second zone is connected to the cylindrical first zone via an essentially tapered surface.

9. A male tubular element according to claim 8, wherein the essentially tapered surface connected to the cylindrical first zone has an apex half angle of 15° or less.

10. A male tubular element according to claim 1, wherein the cylindrical second zone is connected to the internal surface of the main body of the tube via an essentially tapered surface.

11. A male tubular element according to claim 10, wherein the essentially tapered surface connected to the internal surface of the main body of the tube has an apex half angle of 15° or less.

12. A male tubular element according to claim 1, wherein a front surface of the free end is an axial abutment surface for the female tubular element.

13. A threaded tubular connection, comprising a male tubular element according to claim 1 and a female tubular element cooperating with the male tubular element.

14. A method for producing a sealed tubular connection, wherein an initial tubular connection according to claim 13 undergoes diametrical expansion in a plastic deformation region using an expansion tool with a radius which is greater than the internal radius of the cylindrical second zone of the male element, which is axially displaced in the connection.

15. A method according to claim 14, wherein at least one sealing surface is disposed beyond the male threading on the side opposite to the free end and the cylindrical second zone extends to an axial distance from the free end of the male element such that the expansion tool expands the second zone when it axially passes under the sealing surface disposed beyond the male threading.

16. A method for producing a male tubular element according to claim 1, wherein the cylindrical first zone is obtained by a first shaping and the cylindrical second zone is obtained by a second shaping.

17. A method according to claim 16, wherein the second shaping is carried out after the first shaping.

18. A method according to claim 16, wherein the cylindrical second zone is obtained by removing material.

19. A method according to claim 18, wherein the cylindrical second zone is obtained by machining.

20. A method according to claim 16, wherein over a fraction of the length of the end region, prior to producing the cylindrical first zone, the tube undergoes a reduction swaging operation to progressively decrease the external and internal diameters up to the free end.

21. A method according to claim 20, for producing a male tubular element, wherein an essentially tapered surface connecting the cylindrical second zone to the cylindrical first zone is formed by the reduction swaging operation.

22. A method according to claim 20, wherein the reduction swaging operation is carried out prior to the first shaping and the second shaping.

23. A male tubular element according to claim 1, wherein the cylindrical second zone ends at an axial distance from the free end of the male element that is at least equal to a total length of the threaded tubular connection.

* * * * *